(12) United States Patent
Stengel et al.

(10) Patent No.: US 7,207,503 B1
(45) Date of Patent: Apr. 24, 2007

(54) CHEMICAL DISPENSING MEANS FOR A TRAVELLING LAWN SPRINKLER

(76) Inventors: Terry J. Stengel, 1420 Old Farm Rd., Unit 46, Lincoln, NE (US) 68512; Terry E. Mahlman, 3801 Eagle Ridge Rd., Unit 6, Lincoln, NE (US) 68516

( * ) Notice: Subject to any disclaimer, the term of this patent is extended or adjusted under 35 U.S.C. 154(b) by 139 days.

(21) Appl. No.: 11/061,805

(22) Filed: Feb. 21, 2005

(51) Int. Cl.
*B05B 3/18* (2006.01)

(52) U.S. Cl. .................. 239/723; 239/310; 239/315; 239/722; 239/727; 239/747; 239/748; 239/750

(58) Field of Classification Search .................. 239/77, 239/146–170, 211, 289, 303, 304, 310, 315, 239/723, 727, 722, 747, 748, 750, 754
See application file for complete search history.

(56) References Cited

U.S. PATENT DOCUMENTS

| | | | |
|---|---|---|---|
| 1,767,072 | A | 6/1930 | Honn |
| 2,293,796 | A | 8/1942 | Bestor .................. 299/84 |
| D151,118 | S | 9/1948 | Borgerson .................. D91/1 |
| 2,883,116 | A | 4/1959 | Muench .................. 239/191 |
| 3,081,038 | A * | 3/1963 | Sparks et al. .................. 239/748 |
| 3,123,362 | A | 3/1964 | Elvers, Sr. .................. 275/1 |
| 3,260,464 | A | 7/1966 | Harant .................. 239/318 |
| 3,430,859 | A * | 3/1969 | Chow .................. 239/748 |
| 4,059,229 | A | 11/1977 | Pescetto .................. 239/183 |
| 4,648,558 | A | 3/1987 | Rabitsch .................. 239/228 |
| 4,832,263 | A | 5/1989 | Poynor .................. 239/197 |
| 4,908,190 | A * | 3/1990 | Maglio et al. .................. 422/276 |
| 5,076,497 | A | 12/1991 | Rabitsch .................. 239/310 |
| 5,096,123 | A | 3/1992 | Petitgoue .................. 239/310 |
| 5,178,181 | A | 1/1993 | Craig .................. 137/268 |
| 5,413,280 | A * | 5/1995 | Taylor .................. 239/10 |
| 5,419,494 | A | 5/1995 | Harwood .................. 239/211 |
| 5,549,248 | A * | 8/1996 | Baker et al. .................. 239/251 |
| D391,625 | S | 3/1998 | Sabatta .................. D23/220 |
| 5,741,090 | A | 4/1998 | Dunning et al. .................. 405/263 |
| 5,927,603 | A | 7/1999 | McNabb .................. 239/63 |
| 5,950,928 | A | 9/1999 | Giang et al. .................. 239/304 |
| 6,161,779 | A | 12/2000 | Oyler et al. .................. 239/310 |
| D443,915 | S | 6/2001 | Heren et al. .................. D23/220 |
| 6,267,303 | B1 | 7/2001 | Francis .................. 239/318 |
| 2002/0023576 | A1 | 2/2002 | Swanson .................. 111/119 |
| 2002/0056365 | A1 | 5/2002 | Jones .................. 92/13 |
| 2006/0108376 | A1* | 5/2006 | Muir .................. 222/129 |

\* cited by examiner

*Primary Examiner*—Kevin Shaver
*Assistant Examiner*—Jason Boeckmann
(74) *Attorney, Agent, or Firm*—Thomte, Mazour & Niebergall; Dennis L. Thomte

(57) ABSTRACT

A chemical dispenser which is selectively removably mounted on a travelling lawn sprinkler. The chemical dispenser dispenses liquid chemical into the water being sprinkled onto the lawn by the water distributor as the self-propelled travelling lawn sprinkler propels itself across a lawn.

4 Claims, 4 Drawing Sheets

CHEMICAL DISPENSING MEANS FOR A TRAVELLING LAWN SPRINKLER

BACKGROUND OF THE INVENTION

1. Field of the Invention

This invention relates to a travelling lawn sprinkler and more particularly to a travelling lawn sprinkler having a chemical dispensing means associated therewith to enable a liquid chemical to be sprinkled onto the lawn as the sprinkler moves across the lawn and applies water to the lawn.

2. Description of the Related Art

Many types of lawn sprinklers have been provided which not only have the capability of sprinkling water onto a lawn, but also have the capability of dispensing liquid chemicals such as fertilizer into the sprinkling water. For example, see U.S. Pat. Nos. 1,767,072; 2,293,796; 3,260,464; 5,096,123; 5,549,248; 5,950,928; and 6,161,779. None of the sprinkler devices described in the above-identified patents are of the self-propelled type or what is termed a travelling lawn sprinkler. In each of the systems described hereinabove, the sprinkler must be manually moved from location to location since the systems do not have any propulsion means. Typical of the travelling lawn sprinklers of the prior art are those disclosed in U.S. design Pat. 151,118; U.S. Pat. Nos. 883,116; 4,059,229; and U.S. design Pat. 443,915. Each of the travelling lawn sprinklers illustrated in the above-described patents have the capability of propelling themselves along the length of a garden hose so that a large area of the lawn may be sprinkled without requiring a person to manually move the sprinkler from location to location. Applicants believe that heretofore there has not been any travelling lawn sprinkler which has the capability of applying liquid chemicals such as fertilizer onto the lawn as the lawn is being sprinkled.

SUMMARY OF THE INVENTION

The chemical dispensing means of this invention is associated with a conventional travelling lawn sprinkler comprising a sprinkler body having forward and rearward ends and opposite sides with the body having a water distribution apparatus thereon. The body has a pair of transversely spaced drive wheels at the rearward end thereof for driving the sprinkler body along a lawn to be sprinkled on which an elongated hose is deployed to define a path of driving movement. The body also has a hose following guide wheel at its forward end which follows along the deployed hose. The body of the conventional travelling lawn sprinkler has a female hose coupling at its rearward end between the drive wheels thereof. A chemical dispenser is mounted on the travelling lawn sprinkler for dispensing liquid chemical into the water being sprinkled onto the lawn by the water distribution apparatus as the travelling lawn sprinkler propels itself along the deployed hose. The chemical dispenser includes a pair of laterally spaced-apart containers which are mounted on the body of the sprinkler and which are adapted to contain liquid chemicals therein such as fertilizer or the like. A tube extends rearwardly from each of the containers to a venturi tube which is threadably secured to the female hose coupling at the rearward end of the sprinkler body. The water hose is connected to the inlet end of the venturi tube so that as water passes through the venturi tube, liquid chemical is drawn from the pair of tubes into a mixing chamber in the venturi tube so that the liquid chemicals are injected into the sprinkling water. Preferably, a backflow valve is imposed between the discharge end of the hose and the intake end of the venturi body.

It is therefore a principal object of the invention to provide a travelling lawn sprinkler having a chemical dispensing means mounted thereon.

Still another object of the invention is to provide a chemical dispensing means for a travelling lawn sprinkler.

Still another object of the invention is to provide a travelling lawn sprinkler having a chemical dispensing means thereon wherein liquid chemicals are contained within containers mounted on the sprinkler body with the liquid chemicals being drawn from the containers into the sprinkling water by means of a venturi assembly.

Yet another object of the invention is to provide a chemical dispensing means for use with a travelling lawn sprinkler which does not require that the travelling lawn sprinkler be modified in any substantial manner.

Still another object of the invention is to provide a chemical dispensing means for a travelling lawn sprinkler wherein the chemical dispensing means is economical of manufacture, durable in use and refined in appearance.

These and other objects will be apparent to those skilled in the art.

DETAILED DESCRIPTION OF THE INVENTION

Figure 1:
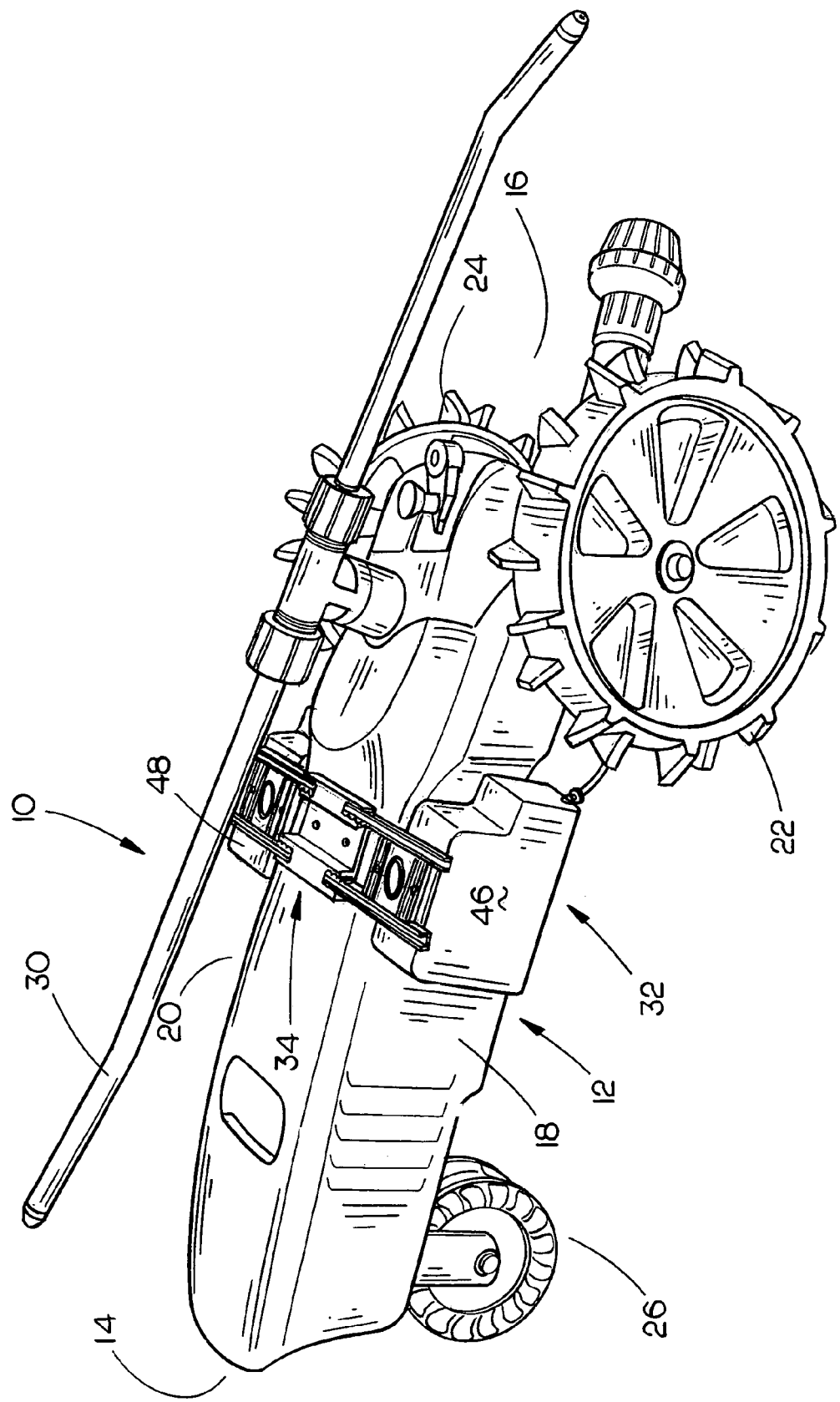
FIG. 1 is a perspective view of a travelling lawn sprinkler having the chemical dispensing means of this invention mounted thereon.
Figure 2:
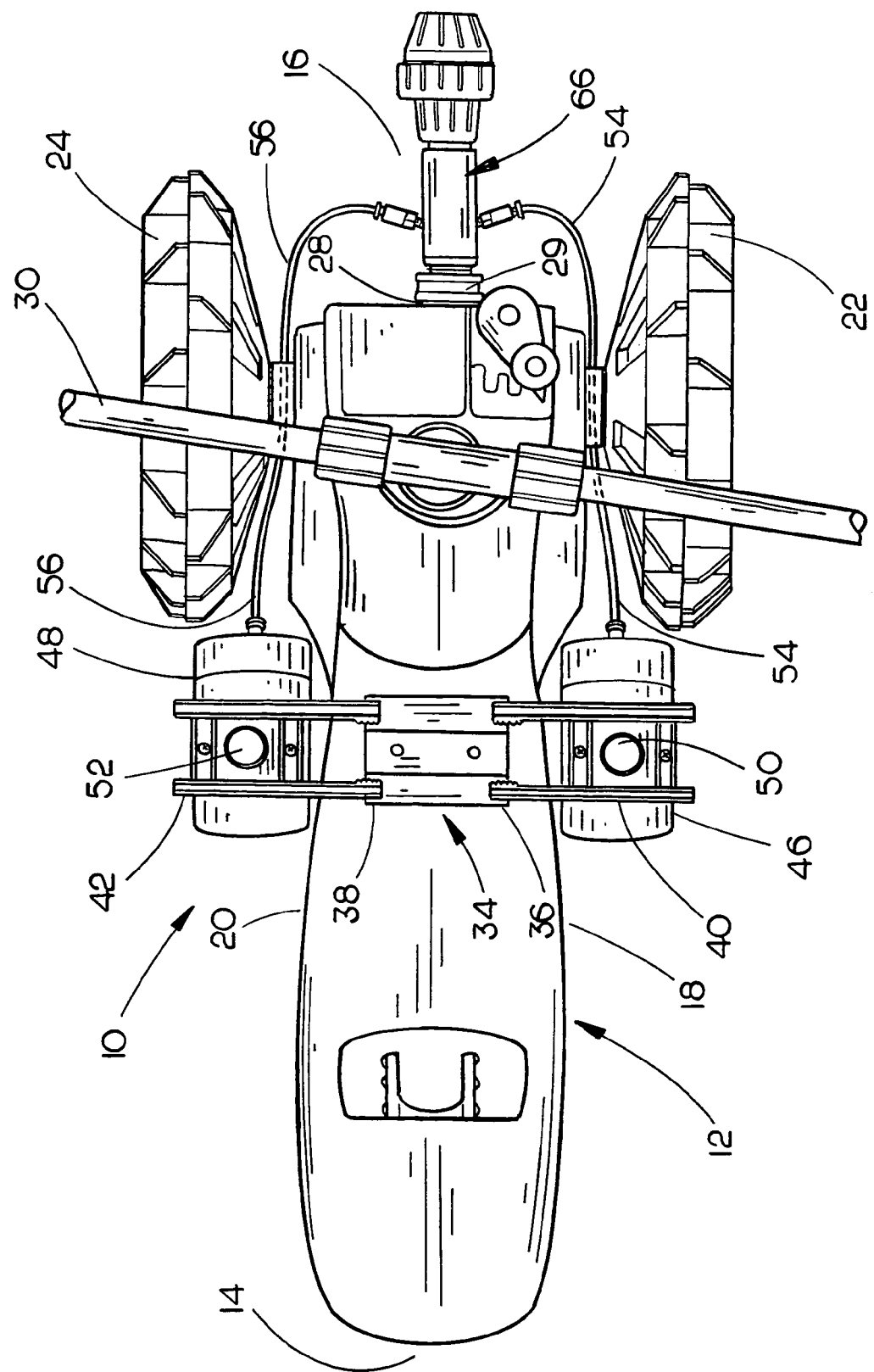
FIG. 2 is a partial top view of a travelling lawn sprinkler having the chemical dispensing means of this invention mounted thereon.
Figure 3:
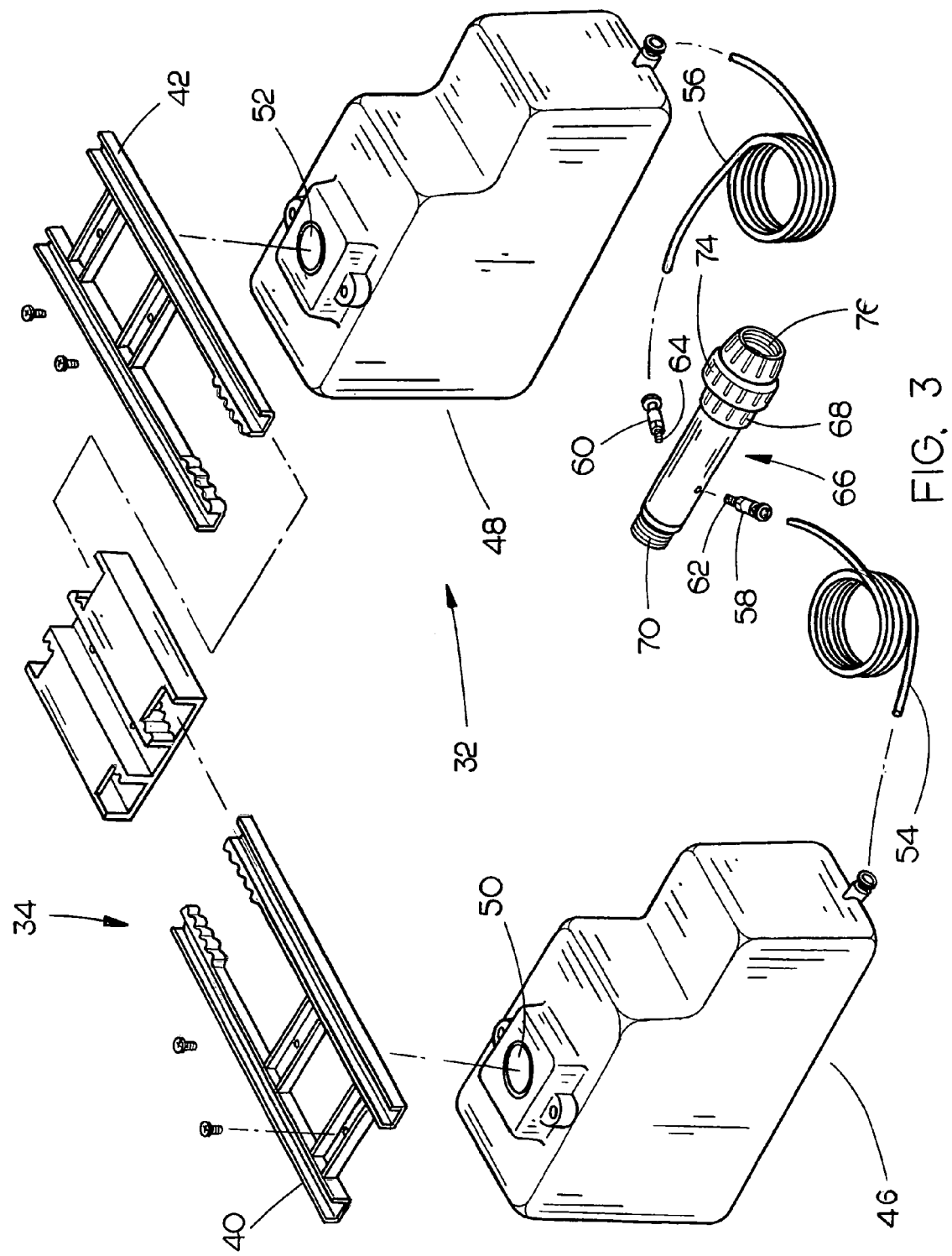
FIG. 3 is an exploded perspective view of the chemical dispensing means of this invention.

The numeral 10 refers to a conventional travelling sprinkler such as marketed by L. R. Nelson Corporation. One travelling sprinkler of L. R. Nelson is described in U.S. Pat. No. 4,059,229. Other types of travelling sprinklers are described or shown in U.S. Pat. Nos. 2,883,116; D443,915; D151,118; and D391,625. The instant invention may be used with almost any type of travelling sprinkler, but is ideally suited for use with the L. R. Nelson travelling sprinkler as generally shown in U.S. Pat. No. 4,059,229.

The travelling sprinkler 10 includes a body 12 which is normally formed of a cast metal material. For purposes of description, body 12 will be described as including a forward end 14, a rearward end 16, and opposite sides 18 and 20. A pair of cleated or lugged drive wheels 22 and 24 are rotatably mounted on the body 12 at the rearward end thereof. A guide wheel 26 is rotatably and pivotally mounted at the forward end of body 12.

The lower rearward end of body 12 is provided with an externally threaded pipe stub 28 having a rotatable hose female connector 29 mounted thereon to which a garden hose is normally connected. Hose connector 29 is in fluid communication with a water drive motor or mechanism positioned in the body 12 so that water passing therethrough will drive the wheels 22 and 24. A rotatable spray bar 30 is rotatably mounted on the body 12 so that water will be sprayed therefrom as the sprinkler 10 moves along the length of the garden hose.

It is to such a travelling sprinkler, or other types of travelling sprinklers, that the instant invention is mounted thereon. The numeral 32 refers to the lawn treatment and fertilizer apparatus of this invention. Apparatus 32 includes a support 34, having ends 36 and 38, which is positioned on the upper end of the body 12 in a transverse fashion with respect to the longitudinal axis of the sprinkler 10. Preferably, the support 34 is comprised of support members 40 and 42 which are selectively slidably secured to base portion 43 of support 34 to enable the support members 40 and 42 to be adjusted relative to one another to accommodate sprinklers of various widths. Tanks or containers 46 and 48 are secured to the ends 36 and 38, respectively, by any convenient means such as by pop rivets or the like. Containers 46 and 48 are provided with selectively closable fill openings 50 and 52 at the upper ends thereof, respectively.

The lower rearward ends of containers 46 and 48 are provided with ports or the like which have flexible tubes 54 and 56 connected thereto, respectively. Tubes 54 and 56 extend rearwardly from containers 46 and 48 and have injector fittings 58 and 60 mounted in the rearward ends thereof, respectively. Injector fittings 58 and 60 have short threaded pipes 62 and 64 provided there, respectively, which extend inwardly into a venturi tube or venturi mixer 66 such as marketed by Stress Engineering Services, Inc. Mixer 66 has a female water hose inlet 68 at its rearward end and a male water hose outlet 70 at its forward end screwed into the hose connector 29 with the garden hose supplying water to the sprinkler being screwed into the inlet 68. Venturi mixer 66 includes a conventional venturi mixing chamber 72.

Figure 4:
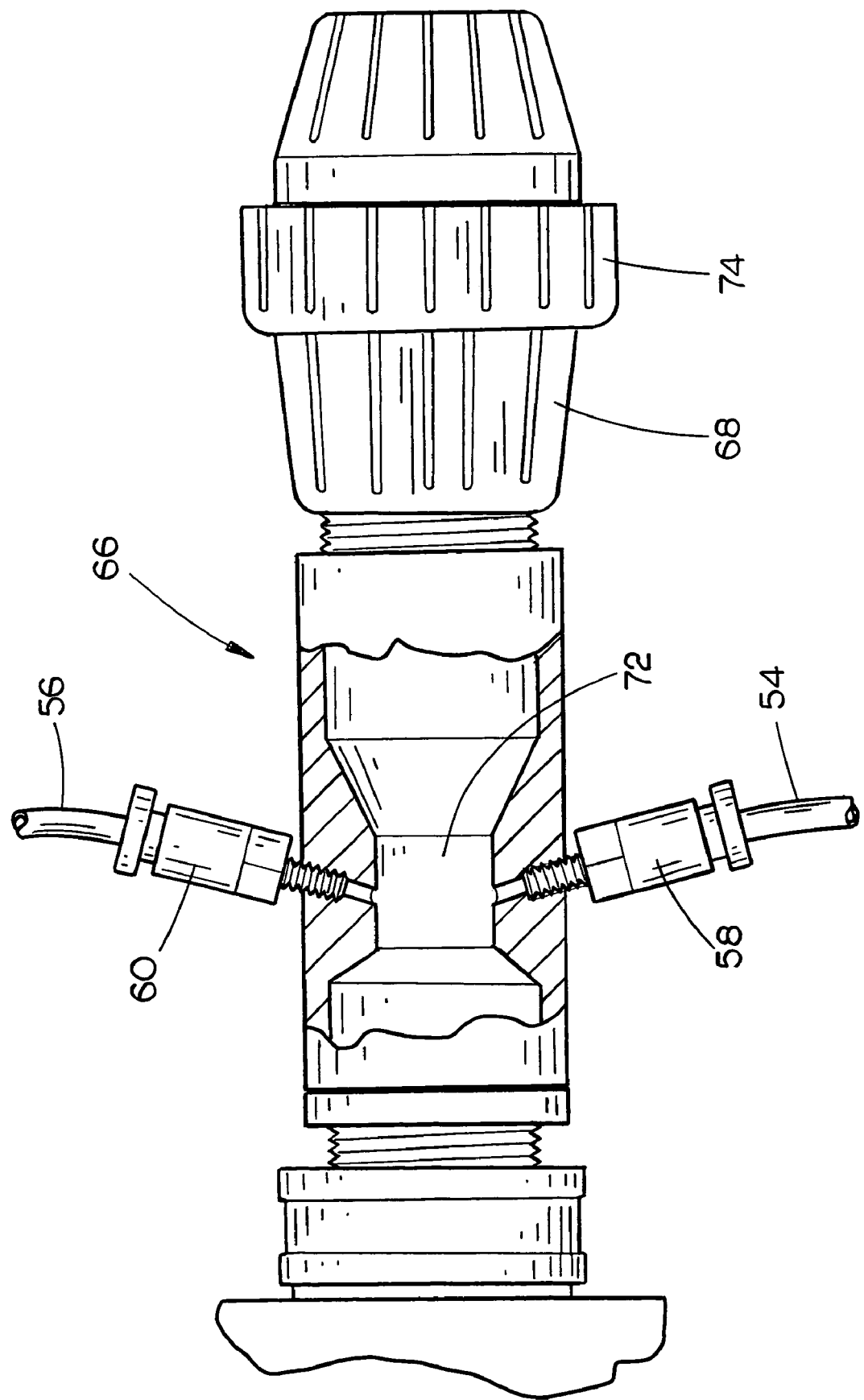
FIG. 4 is a partial sectional view of the venturi mixing tube portion of the invention.

The inner ends of the pipes 62 and 64 are in communication with mixing chamber 72, as seen in FIG. 4, and may be transversely disposed or angularly disposed with respect to the longitudinal axis of the mixer 66.

The rearward end of venturi mixer 66 has a rotatable female water hose inlet 74 mounted thereon. Preferably, a backflow preventer 76 is received within the inlet 74 with the garden hose being connected to the backflow preventer 76. Backflow preventer 76 may be omitted, but it is recommended that it be utilized. Additionally, the backflow preventer 76 could be an integral part of venturi mixer 66.

In use, the containers 46 and 48 are filled with the desired fertilizer or other chemical in the desired concentration. As the sprinkler 10 travels along the length of the deployed garden hose in conventional fashion, the water passing through the venturi tube 66 draws the liquid from the containers 46 and 48 through the tubes 54 and 56 and into the mixing chamber 72 so that the fertilizer or other chemical will be mixed with the water passing through the mixing chamber 72 with the mixture being sprayed from the rotating spray bar 30 onto the lawn.

Thus it can be seen that the invention accomplishes at least all of its stated objectives.

We claim:

1. In combination:

a travelling lawn sprinkler including a sprinkler body having forward and rearward ends and opposite sides with the body having a water sprinkler apparatus thereon for sprinkling water onto a lawn, the body having a pair of transversely spaced drive wheels at the rearward end thereof for driving the sprinkler body along a lawn to be sprinkled on which an elongated hose is deployed to define a path of driving movement, the body also having a hose following guide wheel at its forward end, the body further having a female hose coupling at its rearward end between the drive wheels;

a chemical dispensing apparatus mounted on the travelling lawn sprinkler;

said chemical dispensing apparatus dispensing liquid chemical into the water that is to be sprinkled onto the lawn by the water sprinkler apparatus as the travelling lawn sprinkler propels itself along the deployed hose;

said chemical dispenser comprising a venturi mixer having an intake end and a discharge end, said discharge end of said venturi mixer being in fluid communication with the female hose coupling on the travelling sprinkler, said chemical dispenser also including at least a pair of liquid containers mounted on the sprinkler body which are in communication with said venturi mixer, said intake end of said venturi mixing being in fluid communication with the deployed hose;

said pair of liquid containers being mounted on the sprinkler body forwardly of the drive wheels thereof;

said liquid containers being mounted on opposite sides of the sprinkler body;

said liquid containers being selectively removably positioned on the sprinkler body;

and a transversely extending support means, having opposite ends, positioned on said sprinkler body with said liquid containers being secured to opposite ends of said support means.

2. The combination of claim 1 wherein said support means is length adjustable.

3. A chemical dispensing apparatus for use with a travelling lawn sprinkler which sprinkles water on a lawn and including a sprinkler body having forward and rearward ends and opposite sides with the body having a water distribution apparatus thereon, the body having a pair of transversely spaced drive wheels at the rearward end thereof for driving the sprinkler body along a lawn to be sprinkled on which an elongated hose is deployed to define a path of driving movement, the body also having a hose following guide wheel at its forward end, the body further having a female hose coupling at its rearward end between the drive wheels, comprising:

said chemical dispensing apparatus being mounted on the travelling lawn sprinkler;

said chemical dispensing apparatus dispensing liquid chemical into the water that is to be sprinkled onto the lawn by the water distribution apparatus as the travelling lawn sprinkler propels itself along the deployed hose;

said chemical dispenser comprising a venturi mixer having an intake end and a discharge end, said discharge end of said venturi mixer being in fluid communication with the female hose coupling on the travelling sprinkler, said chemical dispenser also including a pair of liquid containers mounted to the sprinkler body which are in communication with said venturi mixer, said intake end of said venturi mixing being in fluid communication with the deployed hose;

said pair of liquid containers being mounted on the sprinkler body forwardly of the drive wheels thereof;

said liquid containers being mounted on opposite sides of the sprinkler body;

said liquid containers being selectively removably positioned on the sprinkler body;

and a transversely extending support means, having opposite ends, positioned on said sprinkler body with said liquid containers being secured to opposite ends of said support means.

4. The chemical dispensing apparatus of claim 3 wherein said support means is length adjustable.

* * * * *